US009179270B2

United States Patent
Liu et al.

(10) Patent No.: US 9,179,270 B2
(45) Date of Patent: Nov. 3, 2015

(54) INTERCOMMUNICATION METHODS AND DEVICES BASED ON DIGITAL NETWORKS

(71) Applicant: Tencent Technology (Shenzhen) Company Limited, Shenzhen (CN)

(72) Inventors: Yuejun Liu, Shenzhen (CN); Kai Liu, Shenzhen (CN); Liangliang Fan, Shenzhen (CN); Chenglin Liu, Shenzhen (CN); Yi Dan, Shenzhen (CN)

(73) Assignee: TECENT TECHNOLOGY (SHENZHEN) COMPANY LIMITED, Shenzhen, Guangdong Province (CN)

( * ) Notice: Subject to any disclaimer, the term of this patent is extended or adjusted under 35 U.S.C. 154(b) by 179 days.

(21) Appl. No.: 14/105,094

(22) Filed: Dec. 12, 2013

(65) Prior Publication Data

US 2014/0171139 A1    Jun. 19, 2014

Related U.S. Application Data

(63) Continuation of application No. PCT/CN2013/086149, filed on Oct. 29, 2013.

(30) Foreign Application Priority Data

Dec. 17, 2012 (CN) .......................... 2012 1 0548295

(51) Int. Cl.
| | | |
|---|---|---|
| H04Q 1/38 | (2006.01) | |
| H04M 3/42 | (2006.01) | |
| H04M 1/00 | (2006.01) | |
| H04W 4/10 | (2009.01) | |
| H04L 29/06 | (2006.01) | |
| H04L 29/08 | (2006.01) | |

(52) U.S. Cl.
CPC ................. *H04W 4/10* (2013.01); *H04L 67/10* (2013.01); *H04L 65/4061* (2013.01); *H04L 67/16* (2013.01)

(58) Field of Classification Search
CPC ...................................................... H04L 12/24
USPC ............................... 455/566, 414.1, 519, 518
See application file for complete search history.

(56) References Cited

U.S. PATENT DOCUMENTS

2006/0031368 A1    2/2006  deCone
2013/0198772 A1*   8/2013  Wang et al. ..................... 725/32

FOREIGN PATENT DOCUMENTS

| CN | 101111035 A | 1/2008 |
| CN | 101159890 A | 4/2008 |
| CN | 102547487 A | 7/2012 |

OTHER PUBLICATIONS

Tencent Technology, ISRWO, PCT/US2013/086149. Feb. 13, 2014, 7 pgs.
Tencent Technology, IPRP, PCT/US2013/086149. Jun. 23, 2015, 5 pgs.

* cited by examiner

*Primary Examiner* — Tilahun B Gesesse
(74) *Attorney, Agent, or Firm* — Morgan, Lewis & Bockius LLP (57) ABSTRACT

The present application discloses methods and devices for intercommunication between mobile terminals based on digital networks. A first mobile terminal may connect to a uniquely identified server based on a first terminal identifier corresponding to the first mobile terminal. In addition, the first mobile terminal may connect to the server through a default connection setup embedded in the first terminal identifier. By acquiring terminal identifiers corresponding to interacting mobile terminals, the first mobile terminal may establish communication channels with the interacting mobile terminals. After adding the terminal identifiers of the interacting mobile terminals to the contact lists of the first mobile terminal, different regions of the first mobile terminal may be designated to the interacting mobile terminals so that the regions may display the status of communication and serve as interfaces to control receiving, playing, recording, and transmitting digital contents encoding voice messages.

20 Claims, 7 Drawing Sheets

Figure 8

INTERCOMMUNICATION METHODS AND DEVICES BASED ON DIGITAL NETWORKS

RELATED APPLICATIONS

This application is a continuation application of PCT Patent Application No. PCT/CN2013/086149, entitled "INTERCOMMUNICATION METHODS AND DEVICES BASED ON DIGITAL NETWORKS" filed on Oct. 29, 2013, which claims priority to Chinese Patent Application No. 201210548295.7, "INTERCOMMUNICATION METHODS AND DEVICES BASED ON DIGITAL NETWORKS," filed on Dec. 17, 2012, both of which are hereby incorporated by reference in their entirety.

FIELD OF THE INVENTION

The present application relates to the information technology field, and in particular to intercommunication methods and devices based on digital networks.

BACKGROUND OF THE INVENTION

Two-way radios, or walkie-talkies, are portable radio transceivers that do not require any network connection for sound or voice exchanges. Two-way radio is more suitable for frequent contacts between fixed partners because no connection or exchange charges are generated. The device was first developed for the military but later became widely used. The main features of two-way radios include: half-duplex mode (you can only accept or send voice exchanges at a particular time) and you need to press a button before the contents can be transferred. Most two-way radios look like a typical handheld mobile phone with an antenna on the top.

Traditional two-way radios use antenna for transmitting and receiving radio signals. Although it does not require network support or generate charges, two-way radios still have the following disadvantages: the communication is significantly limited by distance; the devices must be purchased and sometimes supplemental transmitting devices need to be purchased separately, making the overall cost very high; the two-way radios may only communicate between one another, without any connection to regular mobile phones and other devices; most countries heavily regulate radio frequencies—using public frequencies jeopardizes privacy, but using other frequencies needs government approval.

In order to solve the above problems of the conventional two-way radio, some application programs have been developed for mobile phones. After installing one of the application programs, users may communicate with one another in a similar manner as a conventional two-way radio, though the communication is based on digital network technologies such as WiFi, GRPS, and 3G. Such an approach eliminates disadvantages such as distance limitations, purchasing of separate intercom equipments, lack of privacy protection, and government regulations of frequencies. However, this approach also requires the users to download, install, and get familiar with the application software, resulting in complex operation and causing inconvenience.

Accordingly, it is necessary and desirable to provide a new technology, so as to resolve the technical problem and improve the above-mentioned approach.

SUMMARY

The above deficiencies and other problems associated with intercommunication are reduced or eliminated by the invention disclosed below. In some embodiments, the invention is implemented in a computer system that has one or more processors, memory and one or more modules, programs or sets of instructions stored in the memory for performing multiple functions. Instructions for performing these functions may be included in a computer program product configured for execution by one or more processors.

One aspect of the invention involves a computer-implemented method performed by a first mobile terminal. The first mobile terminal may connect to a server based on a first terminal identifier corresponding to the first mobile terminal, wherein the first mobile terminal is uniquely identified by the first terminal identifier at the server and the first mobile terminal connects to the server through a default connection setup embedded in the first terminal identifier. In addition, the first mobile terminal may acquire, from the server, terminal identifiers corresponding to interacting mobile terminals and establish communication channels between the first mobile terminal and the interacting mobile terminals through the server based on the terminal identifiers. Then, the first mobile terminal may add the terminal identifiers of the interacting mobile terminals to a contact list of the first mobile terminal, designate different regions of the first mobile terminal as corresponding to the interacting mobile terminals, wherein each region has an alterable display status; and set the display status of the regions, wherein the display status is selected from the group consisting of: (1) not designated; (2) designated but not verified; (3) designated and verified; (4) designated, verified, but not authorized to send voice messages to the interacting terminal associated with the region; and (5) designated, verified, and authorized to send voice messages to the interacting terminal associated with the region. Finally, the first mobile terminal may receive digital contents encoding voice messages from an interacting mobile terminal, wherein the region associated with the interacting mobile terminal displays an alert at the region upon receiving the digital contents; play the voice message upon a user selection of the region; and record user input voice messages upon a user holding the region.

Another aspect of the invention involves a computer system. The computer system may comprise a server, a first mobile terminal, and one or more interacting mobile terminals, the first mobile terminal having one or more processors, memory, and one or more programs modules stored in the memory and configured for execution by the one or more processors, the one or more program modules including: a connecting module configured to connect to the server based on a first terminal identifier corresponding to the first mobile terminal, wherein the first mobile terminal is uniquely identified by the first terminal identifier at the server and the first mobile terminal connects to the server through a default connection setup embedded in the first terminal identifier; an identification module having a terminal identifier subunit and a communication channel subunit, wherein: the terminal identifier subunit is configured to acquire, from the server, terminal identifiers corresponding to interacting mobile terminals, and the communication channel subunit is configured to establish communication channels between the first mobile terminal and the interacting mobile terminals through the server based on the terminal identifiers; a processing module having an addition subunit, a designation subunit, and a display status subunit, wherein: the addition subunit is configured to add the terminal identifiers of the interacting mobile terminals to a contact list of the first mobile terminal, the designation subunit is configured to designate different regions of the first mobile terminal as corresponding to the interacting mobile terminals, wherein each region has an alterable display status, and the display status subunit is configured to set the display status of the regions, wherein the display status is selected from the group consisting of: (1) not designated, (2) designated but not verified, (3) designated and verified, (4) designated, verified, but not authorized to send voice messages to the interacting terminal associated with the region, and (5) designated, verified, and authorized to send voice messages to the interacting terminal associated with the region; and a communication module having a receiving subunit, a playing subunit; and a recording subunit, wherein: the receiving subunit is configured to receive digital contents encoding voice messages from an interacting mobile terminal, wherein the region associated with the interacting mobile terminal displays an alert at the region upon receiving the digital contents, the playing subunit is configured to play the voice message upon a user selection of the region, and the recording subunit is configured to record user input voice messages upon a user holding the region.

Another aspect of the invention involves a non-transitory computer readable storage medium having stored therein instructions, which, when executed by a first mobile terminal, cause the first mobile terminal to: connect to a server based on a first terminal identifier corresponding to the first mobile terminal, wherein the first mobile terminal is uniquely identified by the first terminal identifier at the server and the first mobile terminal connects to the server through a default connection setup embedded in the first terminal identifier; acquire, from the server, terminal identifiers corresponding to interacting mobile terminals; establish communication channels between the first mobile terminal and the interacting mobile terminals through the server based on the terminal identifiers; add the terminal identifiers of the interacting mobile terminals to a contact list of the first mobile terminal; designate different regions of the first mobile terminal as corresponding to the interacting mobile terminals, wherein each region has an alterable display status; set the display status of the regions, wherein the display status is selected from the group consisting of: (1) not designated, (2) designated but not verified, (3) designated and verified, (4) designated, verified, but not authorized to send voice messages to the interacting terminal associated with the region, and (5) designated, verified, and authorized to send voice messages to the interacting terminal associated with the region; receive digital contents encoding voice messages from an interacting mobile terminal, wherein the region associated with the interacting mobile terminal displays an alert at the region upon receiving the digital contents; and play the voice message upon a user selection of the region; and record user input voice messages upon a user holding the region.

Some embodiments may be implemented on either the terminal side or the server side of a terminal-server network environment.

BRIEF DESCRIPTION OF THE DRAWINGS

The aforementioned features and advantages of the invention as well as additional features and advantages thereof will be more clearly understood hereinafter as a result of a detailed description of preferred embodiments when taken in conjunction with the drawings.

Like reference numerals refer to corresponding parts throughout the several views of the drawings.

DESCRIPTION OF EMBODIMENTS

Reference will now be made in detail to embodiments, examples of which are illustrated in the accompanying drawings. In the following detailed description, numerous specific details are set forth in order to provide a thorough understanding of the subject matter presented herein. But it will be apparent to one skilled in the art that the subject matter may be practiced without these specific details. In other instances, well-known methods, procedures, components, and circuits have not been described in detail so as not to unnecessarily obscure aspects of the embodiments.

Figure 7:
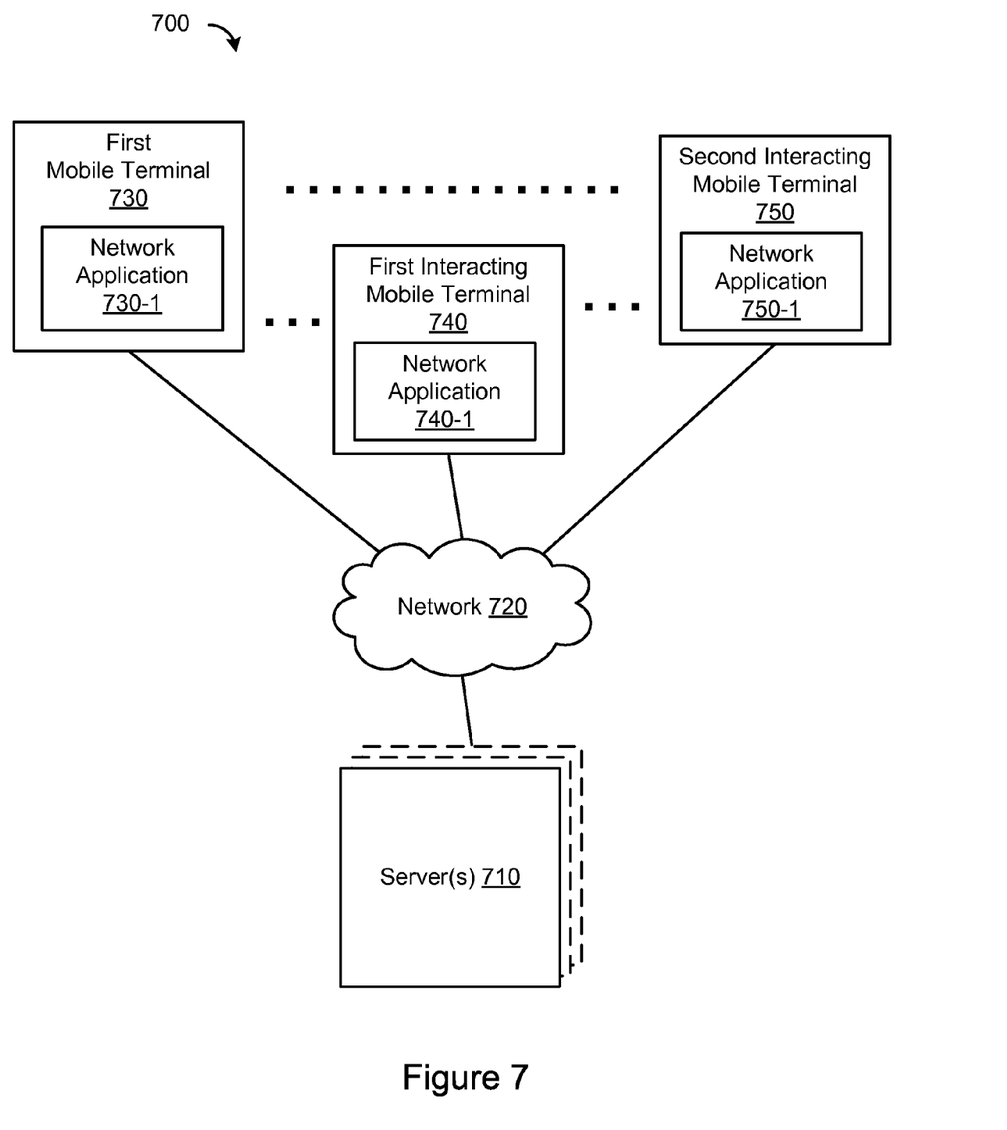
FIG. 7 is a block diagram of a network environment in accordance with some embodiments of the present application.

FIG. 7 is a block diagram of a network environment in accordance with some embodiments of the present application. The network environment 700 includes one or more servers 710, one first mobile terminal 730, and one or more interacting mobile terminals (730, 740). The first mobile terminal and the interacting mobile terminals are connected to the servers via a network 720 (e.g., the Internet). Meanwhile, different mobile terminal may be able to communicate with each other via the network 720. Through the network 720, the first mobile terminal 730 and the interacting mobile terminals 740 and 750 in the network environment 700 may exchange information with one another using network applications 730-1, 740-1, and 750-1. The server 710 interacts with the first mobile terminal 730 and the interacting mobile terminals (740, 750) and maintains communication channels between the first mobile terminal and the interacting mobile terminals.

Figure 1:
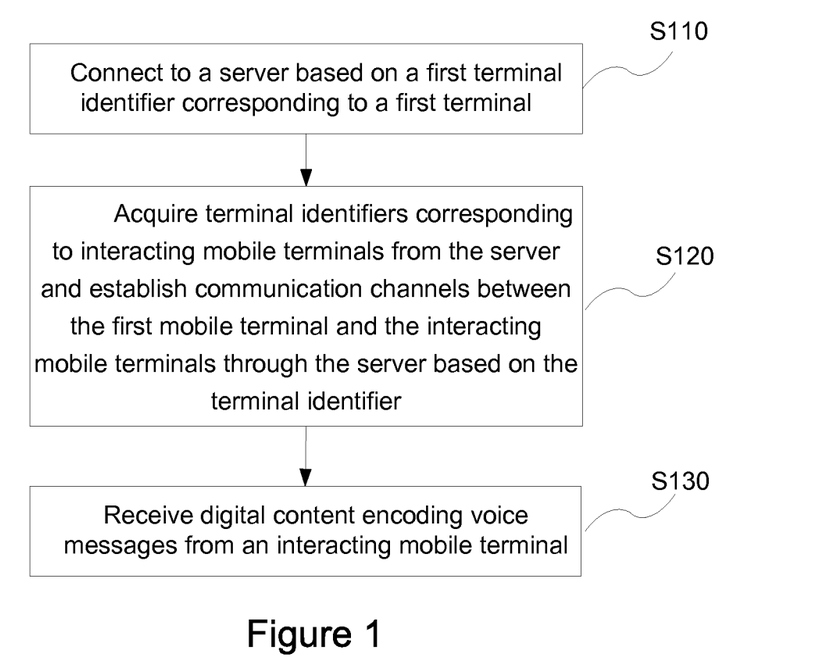
FIG. 1 is a flowchart illustrative of a method for intercommunication between a first mobile terminal and one or more interacting mobile terminals in accordance with some embodiments of the present application.

FIG. 1 is a flowchart illustrative of a method for intercommunication between a first mobile terminal and one or more interacting mobile terminals in accordance with some embodiments of the present application.

Step S110 shows that the first mobile terminal may connect to a server based on a first terminal identifier corresponding to the first mobile terminal, wherein the first mobile terminal is uniquely identified by the first terminal identifier at the server and the first mobile terminal connects to the server through a default connection setup embedded in the first terminal identifier.

The first mobile terminal may be any computing device that has networking capability and is able to receive, transfer, and play digital contents such as but not limited to contents encoding audios and voice messages. The first mobile terminal may be a smart phone, a tablet computer, a personal digital assistant (PDA), a digital photo frame, a laptop computer, or a desktop computer. The server may be any computing device that that is capable of providing data processing and networking capabilities.

As shown by Step S120, the first mobile terminal may acquire terminal identifiers corresponding to interacting mobile terminals from the server and establish communication channels between the first mobile terminal and the interacting mobile terminals through the server based on the terminal identifiers.

As shown by Step S130, after the communication channels are established, the first mobile terminal may receive digital content encoding voice messages from an interacting mobile terminal.

Figure 2:
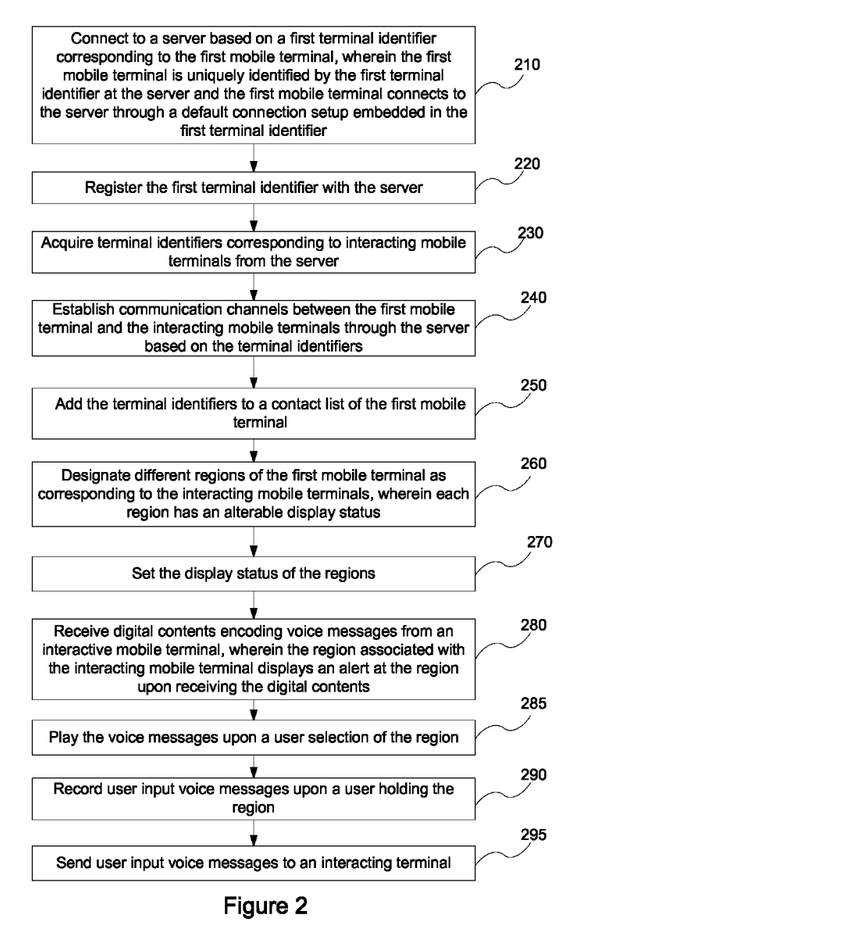
FIG. 2 is a detailed flowchart illustrative of the method for intercommunication between a first mobile terminal and one or more interacting mobile terminals in accordance with some embodiments of the present application.

FIG. 2 is a detailed flowchart illustrative of the method for intercommunication between a first mobile terminal and one or more interacting mobile terminals in accordance with some embodiments of the present application. FIG. 2 provides more steps and optional features for the method described in FIG. 1.

Figure 6:
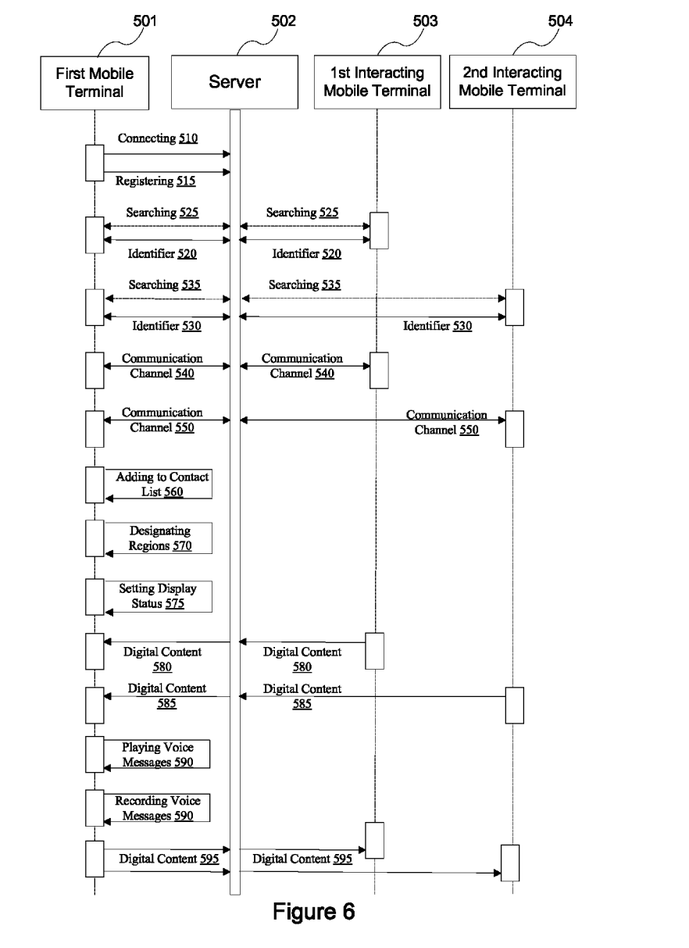
FIG. 6 is a schematic illustration of how a server, a first mobile terminal, and two interacting mobile terminals interact to establish communications and intercommunicate in accordance with some embodiments of the present application.

FIG. 6 is a schematic illustration of how a server 502, a first mobile terminal 501, and two interacting mobile terminals 503 and 504 interact to establish communications and intercommunicate with one another in accordance with some embodiments of the present application. FIG. 6 provides an exemplary process for the method disclosed in FIG. 2.

Referring to FIG. 2, Step 210 shows that the first mobile terminal may connect to a server based on a first terminal identifier corresponding to the first mobile terminal, wherein the first mobile terminal is uniquely identified by the first terminal identifier at the server and the first mobile terminal connects to the server through a default connection setup embedded in the first terminal identifier.

The first terminal identifier may be any device, chip, symbol, code, data, or electronic or magnetic information item that may be used to identify the first mobile terminal and contain certain information. The first terminal identifier may have a one-to-one corresponding relationship with the first mobile terminal and the first mobile terminal may be uniquely identified by the first terminal identifier. In some embodiments, the first terminal identifier is an identifier based on the radio-frequency identification (RFID) technology or other wireless networking technologies. In some embodiments, the first terminal identifier may be a chip identification code or a read-only memory embedded in the first mobile terminal. In some other embodiments, the first terminal identifier may be a barcode (e.g. 2-dimension barcode) attached to the external surface of the first mobile terminal or embedded in the first mobile terminal. The first terminal identifier (e.g. barcode) may be acquired by the server or other devices or terminals that may be connected to the first mobile terminal. When the first terminal identifier is a barcode or a RFID tag, the first terminal identifier may be read by another device with scanning or radio-frequency detection. In general, the scanning or detecting apparatus must be in close proximity of the first mobile terminal, making the user of the first mobile terminal aware that the first terminal identifier is being read. Such an approach may help to protect privacy and avoid unwanted access and harassment.

The server, as indicated above, may be any computing device. The server may comprise network applications that may be used to connect to the first mobile terminal and the mobile terminals. In some embodiments, the server, together with the network application, is uniquely identified by the first terminal identifier—the first terminal identifier does not identify other systems or platforms to be used for the data transfer except the server. The connection setup between the first mobile terminal and the server may be embedded in the first terminal identifier, allowing the first mobile terminal to connect to the server through a default setup. With such an approach, the user of the first mobile terminal does not need to specifically download an application program for data transfer. Moreover, the user does not need to specifically set up the network with the server because the connection is automatically configured based on the information encoded by the first terminal identifier. In some embodiments, the first terminal identifier is connected to the server by visiting fixed IP addresses or domain names associated with the server, setting up a network connection with the server.

Referring to FIG. 2, Step 220 shows that the first mobile terminal may be registered with the server. The registration process may take place before or after the connection is established. For example, the manufacturer of the first mobile terminal may register all such devices with the server before the first mobile terminal is shipped to a user. On the other hand, the first mobile terminal may be registered by the user of the first mobile terminal with the server once a connection between the first mobile terminal and the server is established. Registering the first mobile terminal may involve providing information about the first mobile terminal to the server, such information may include but not limited to: the first terminal identifier and its contents, the make and model of the first mobile terminal, and the location of the first mobile terminal. Registering the first mobile terminal may also involve setting up an account for the first mobile terminal, wherein the account may be used to store digital contents and other information items associated with the first mobile terminal.

The first terminal identifier allows the first mobile terminal to connect to the server with a default setup. In addition, the first terminal identifier allows the first mobile terminal to be searched and readily identified. Other devices connected to the server may use various criteria to search for first mobile terminals and the most direct approach is to search for the first terminal identifier. In addition, other information associated with the first mobile terminal, e.g. location, may also be used for searching the first mobile terminal.

Referring to FIG. 6, the first mobile terminal 501 may connect to the server 502 in step 510, as indicated in step 210 of FIG. 2. In addition, the first mobile terminal 501 may register with the server 502 in step 515, as indicated in step 220 of FIG. 2.

Referring to FIG. 2, as show by step 230, the first mobile terminal may acquire terminal identifiers corresponding to interacting mobile terminals from the server. The interacting mobile terminals are the devices that may transfer data to the first mobile terminal and receive data from the first mobile terminal. The interacting mobile terminals may be any computing devices as indicated for the first mobile terminal. In some embodiments, the interacting mobile terminals may be smart phones, tablet computers, PDAs, or digital photo frames.

Each interacting mobile terminal may have a terminal identifier, wherein the terminal identifier may be any device, chip, code, symbol, data, or electronic or magnetic information item as described for the first terminal identifier. Each terminal identifier may have a one-to-one corresponding relationship with a particular interacting mobile terminal and may be used to identify that terminal. The terminal identifier may contain or encode information regarding the interacting mobile terminal so that the interacting mobile terminal may be found by the server and/or the first mobile terminal. As the first mobile terminal, the interacting mobile terminals may be registered with the server and accounts may be set up for the interacting mobile terminals, respectively.

The interacting mobile terminal may be connected to the server and further to the first mobile terminal through a number of ways. In some embodiments, the server is a uniquely identified system or platform that corresponds to the terminal identifier. Similar to the first mobile terminal identifier, the terminal identifier may contain or encode a default connection setup to initiate and process the connection between the mobile terminal and the server.

The first mobile terminal may acquire the terminal identifiers of the interacting mobile terminals through various processes, such as scanning the terminal identifiers when the terminal identifiers are barcodes, or receiving the terminal identifiers when the terminal identifiers may be transferred via radio or other wireless signals. In some embodiments, the first mobile terminal may acquire the terminal identifiers by searching for the terminal identifiers based on information associated with the interacting mobile terminals, e.g. searching for interacting mobile terminals close to a certain location. In some embodiments, the first mobile terminal may connect to the interacting mobile terminals without acquiring the terminal identifiers, as long as the first mobile terminal provide sufficient information to the server to identify the interacting mobile terminals.

The acquisition of terminal identifiers by the first mobile terminal helps to establish connections between the first mobile terminal and the interacting mobile terminals. However, it should also be noted that such connections may be initiated by either the interacting mobile terminals or the first mobile terminal. The interacting mobile terminals may acquire the first terminal identifier or search for the first terminal based on information associated with the first terminal. Connections may be set up based on the first terminal identifier or on information that uniquely identifies the first mobile terminal. The interacting mobile terminals may acquire the first terminal identifier of the first mobile terminal through various processes, such as scanning the first terminal identifier when the first terminal identifier is a barcode, or receiving the first terminal identifier when the first terminal identifier may be transferred via radio or other wireless signals. In some embodiments, the interacting mobile terminal may acquire the first terminal identifier by searching for the first terminal identifier based on information associated with the first mobile terminal, e.g. searching for first mobile terminals close to a certain location.

Referring to FIG. 6, steps 525 and 535 show that the first mobile terminal 501 may search for the first interacting mobile terminal 503 and the second interaction mobile terminal 504 through the server 502. Similarly, steps 525 and 535 indicated that the first interacting mobile terminal 503 and the second interaction mobile terminal 504 may search for the first mobile terminal 501 through the server. The searching steps are optional for acquiring the identifiers. As shown by steps 520 and 530, the first mobile terminal 501 may acquire the terminal identifiers of the first interacting mobile terminal 503 and the second interaction mobile terminal 504. Similarly, the first interacting mobile terminal 503 and the second interaction mobile terminal 504 may acquire the first terminal identifier of the first mobile terminal 501.

Referring to FIG. 2, step 240 shows that the first mobile terminal may establish communication channels between the first mobile terminal and the interacting mobile terminals through the server based on the terminal identifiers.

Through the server, a first mobile terminal may send a connecting request to the interacting mobile terminals, which may be granted so that the first mobile terminal may establish a communication channel between the first mobile terminal and the interacting mobile terminals. Similarly, an interacting mobile terminal may send a connecting request to the first mobile terminal, which may be granted so that the first mobile terminal may establish a communication channel between the first mobile terminal and the interacting mobile terminals. As indicated above, it is not required for the any mobile terminal (first mobile terminal or interacting mobile terminals) to acquire the identifiers before establishing the communication channels between the mobile terminals. As long as the mobile terminal receiving the connection request may be uniquely identified, the communication channel may be established based on any information.

In some embodiments, each connecting request from a mobile terminal (first mobile terminal or interacting mobile terminals) may contain the identifier (first terminal identifier or terminal identifiers for the interacting mobile terminals) for the corresponding mobile terminal. Inclusion of the identifier allows identification of the mobile terminal by the server, and further facilitates connection between the first mobile terminal and the interacting mobile terminal, through the server.

Referring to FIG. 6, the first mobile terminal 501 may establish communication channels 540 and 550 with the first interacting mobile terminal 503 and the second interacting mobile terminal 504, respectively, through the server 502.

As indicated above, the embodiment shown in FIG. 6 is considered an example of the interactions between the devices. The number of devices involved in the current system may vary according to the needs of the users, the capacity of the server and the application programs, and the hardware capabilities of the first mobile terminals and interacting mobile terminals. There may be multiple first mobile terminals and/or multiple interacting mobile terminals, forming a number of connections that allow intercommunication.

To facilitate the process of establishing connections, some automatic processes may be adopted, especially when there are multiple first mobile terminals and/or multiple interacting mobile terminals. For example, the first terminal identifiers and/or the terminal identifiers may be transferred automatically after certain actions. For instance, the user may shake the first mobile terminal or the interacting mobile terminals; the sensors in the first mobile terminal or interacting mobile terminals may detect such motions; then the first terminal identifiers or terminal identifiers may be automatically transferred to the server; connecting requests from the first mobile terminals or interacting mobile terminals may also be transferred to the server; when certain conditions are satisfied, e.g. close to a particular location (within 30 meters for instance) or within a particular time period (within one minute for instance), shaking a interacting mobile terminal or first mobile terminal may initiate the process of receiving the connecting request and further processing. The identifiers may be transferred and acquired through the near field communication (NFC) technology. Moreover, the identifiers may be barcodes that may be scanned or RFID tags that may be detected.

Since both first mobile terminal and the interacting mobile terminals are connected to the server, either when the first mobile terminal identifies the mobile terminals or when the mobile terminals identify the first mobile terminal, communication channels may be established between the first mobile terminal and the mobile terminals. The data transfer may be based on general packet radio service (GPRS) technology, wifi, or any generation of mobile telecommunication (e.g. 3G, 4G, etc.) technology.

Referring to FIG. 2, step 250 shows that the first mobile terminal may add the terminal identifiers of the terminal identifiers of the interacting mobile terminals to a contact list of the first mobile terminal. To keep records and monitor the interacting mobile terminals, the contact list may list and rank the interacting mobile terminals based on certain criteria such as the serial numbers or models of the interacting mobile terminals. In addition, each interacting mobile terminal may add the first mobile terminal of the first terminal identifier to a terminal contact list associated with the interacting mobile terminal.

Referring to FIG. 6, step 560 shows that the first mobile terminal 501 may add the terminal identifiers of the interacting mobile terminals 503 and 504 to a contact list of the first mobile terminal 501.

Referring to FIG. 2, step 260 shows that the first terminal may designate different regions of the first mobile terminal as corresponding to the interacting mobile terminals, wherein each region has an alterable display status.

In some embodiments, the regions designated to the interacting mobile terminals may appear on the display interface (e.g. screen) of the first mobile terminal. In some embodiments, the regions may be separate mini-screens or buttons with background lights. The regions may have display status and the show the display status. In some embodiments, the display status may be shown by colors, patterns, pictures, photos, texts, or any combination thereof. The regions may be preset so that some regions are not-designated and may later become designated. Alternatively, the regions may be created when the first mobile terminal is connected to a new mobile terminal. The regions may be aligned, cascaded, or arranged in any distinguishable pattern on the first mobile terminal so that each region may be distinct from another region and the user may locate a certain region without too much difficulty.

Referring to FIG. 6, as shown by step 570, the first mobile terminal 501 may designate different regions of the first mobile terminal 501 so that the regions correspond to the first interacting mobile terminal 503 and the second interacting mobile terminal 504.

Referring to FIG. 2, step 270 shows that the first terminal may set the display status of the regions. In some embodiments, the display status of the regions may vary according to the designation and level of accessibility assigned to the interacting mobile terminal associated with the region. For example, the display status of the regions may be: (1) not designated; (2) designated but not verified; (3) designated and verified; (4) designated, verified, but not authorized to send voice messages to the interacting terminal associated with the region; and (5) designated, verified, and authorized to send voice messages to the interacting terminal associated with the region.

As indicated above, the regions may show different displays according to the display status. For example, when a region is not designated, the region may show a blank screen and if the region is a physical button or a signal light, the region may be completely turned off. When the region is designated but not verified, the region may display texts such as "waiting for verification" or show flashing red lights. When the region is designated and verified, the region may display text such as "verified" or show stable red lights. When the region is designated, verified, but not authorized to send voice messages, the region may display corresponding texts or flashing green light. When the region is designated, verified, and authorized to send voice messages, the region may display corresponding text or stable green light.

In addition to the status stated above, the display status may also be: not authorized to receive voice messages; authorized to receive voice messages; receiving voice messages; receiving digital contents that are not voice messages; and additional reminders. The region may show corresponding colors, patterns, pictures, photos, texts, or any combination thereof. For instance, when the first mobile terminal is not authorized to receive voice messages, the region may show corresponding text or display a flashing blue light; when the first mobile terminal is authorized to receive voice messages, the region may show corresponding text or display a stable blue light; when the first mobile terminal is receiving voice messages, the region may show corresponding text or display a flashing white light; when the first mobile terminal is receiving digital contents not voice messages, the region may show corresponding text or display a flashing yellow light. Additional reminders may refer to situations such as the network connect is broken off or unstable, and the region may show corresponding text or stable purple light.

The displays herein stated that correspond to the display status are only examples. The user and the server may set different displays for different display status.

Referring to FIG. 6, step 575 shows that the first mobile terminal 501 may set display status of the regions.

Referring to FIG. 2, step 280 shows that the first mobile terminal may receive digital contents encoding voice messages from one of the interacting mobile terminals. In some embodiments, the region associated with the interacting mobile terminal displays an alert at the region upon receiving the digital contents. In addition to the voice messages, the digital contents may be any informational items such as audio, video, pictures, photos, and other data. In some implementations, the data transfer may be based on general packet radio service (GPRS) technology, wifi, or any generation of mobile telecommunication (e.g. 3G, 4G, etc.) technology. The designated regions may be used to provide alerts that digital contents are being transferred to the first mobile terminal from the corresponding mobile terminal. The regions may also be used to display the status of the interacting mobile terminals. For example, if an interacting mobile terminal is blocked by a user of the first mobile terminal, the region designated to the interacting mobile terminal may show that the terminal is blocked.

Referring to FIG. 6, steps 580 and 585 show that the first mobile terminal 501 may receive digital contents from the first interacting mobile terminals 503 and the second interacting mobile terminals 504.

Referring to FIG. 2, step 285 shows that the first mobile terminal may play the voice messages. In some embodiments, the regions may be used as selection interfaces and the first mobile terminal may play the voice messages when a user selects the region associated with the interacting mobile terminal that sent the voice messages. Such an approach allows the user to clearly identify what digital content/voice message is sent by which interacting mobile terminal. As indicated above, the regions may be arranged in any pattern. For example, the regions may be aligned on the screen of the first mobile terminal without any overlap, allowing clear view by the user.

Referring to FIG. 6, step 590 shows that the first mobile terminal 501 may play the voice messages encoded by the digital contents received from the first interacting mobile terminals 503 and second interacting mobile terminals 504.

Referring to FIG. 2, step 290 shows that the first mobile terminal may record user input voice messages. In some embodiment, the recording may be conducted upon a user holding the region associated with the interacting mobile terminal to which the voice message may be sent. Alternatively, there may be a recording button and the user may press the recording button during the voice message is recorded.

Referring to FIG. 6, step 590 shows that the first mobile terminal 501 may record user input voice messages before sending such messages out.

Referring to FIG. 2, step 295 shows that the first mobile terminal may send the recorded user input voice messages to one or more interacting mobile terminals.

The steps of 290 and 295 may be conducted simultaneously—the recording and sending of the voice messages are conducted at the same time. Such an approach limits instant network transmission volume and prevents clogging. When neither the first mobile terminal nor the interacting mobile terminal is recording or sending voice messages, only very limited number of data packets are transmitted to maintain the communication channel between the first mobile terminal and the interacting mobile terminals, preventing waste of bandwidth due to background sound. When any mobile terminal, e.g. the first mobile terminal, starts to record voice messages, the transmission of digital contents encoding the voice messages may also start, making a real time communication.

On the other hand, the steps of 290 and 295 may be conducted separately—the voice messages are only sent after the recording is completed. In operation, the user may hold the region designated to an interacting mobile terminal during recording and release the region to start sending the voice messages. The separation of recording and transmission allows further compression of the voice messages, reducing the amount of data transmitted.

Referring to FIG. 6, as shown in step 595, the first mobile terminal 501 may send the digital contents to the first interacting mobile terminal 503 and the second interacting mobile terminal 504, respectively, through the server 502.

FIGS. 3-5 and 8 illustrate the computer systems that may be used to perform the methods described above. To avoid redundancy, not all the details and variations described for the method are herein included for the devices. Such details and variations should be considered included for the description of the devices as long as they are not in direct contradiction to the specific description provided for the devices.

Figure 3:
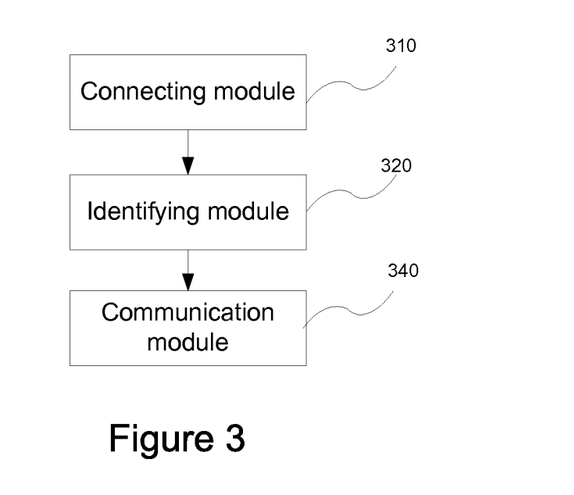
FIG. 3 is a block diagram illustrative of a first mobile terminal comprising modules configured to intercommunicate with one or more interacting mobile terminals in accordance with some embodiments of the present application.

FIG. 3 is a block diagram illustrative of a first mobile terminal comprising modules configured to intercommunicate with one or more interacting mobile terminals in accordance with some embodiments of the present application. The first mobile terminal may have one or more processors; memory; and one or more programs modules stored in the memory and configured for execution by the one or more processors, the one or more program modules including: a connecting module 310 configured to connect to the server based on a first terminal identifier corresponding to the first mobile terminal, wherein the first mobile terminal is uniquely identified by the first terminal identifier at the server and the first mobile terminal connects to the server through a default connection setup embedded in the first terminal identifier; an identification module 320 configured to acquire, from the server, terminal identifiers corresponding to interacting mobile terminals and to establish communication channels between the first mobile terminal and the interacting mobile terminals through the server based on the terminal identifiers; and a communication module 340 configured to receive digital contents encoding voice messages from an interacting mobile terminal, wherein the region associated with the interacting mobile terminal displays an alert at the region upon receiving the digital contents, play the voice message upon a user selection of the region, and record user input voice messages upon a user holding the region.

Figure 4:
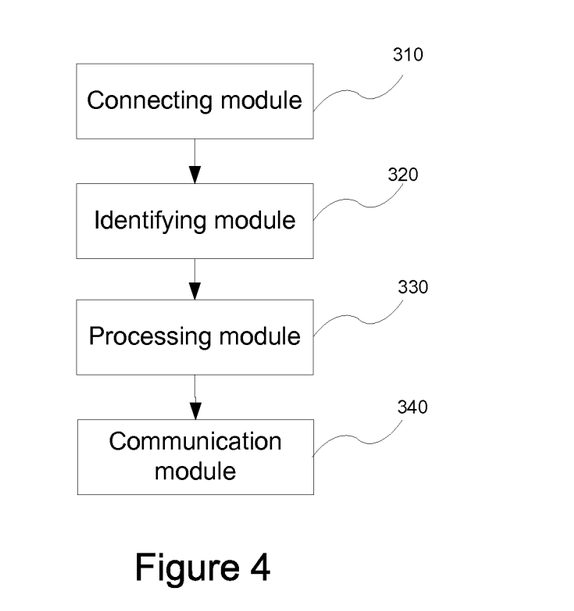
FIG. 4 is a block diagram illustrative of a first mobile terminal comprising modules configured to intercommunicate with one or more interacting mobile terminals in accordance with some embodiments of the present application, providing more details.

FIG. 4 is a block diagram illustrative of a first mobile terminal comprising modules configured to intercommunicate with one or more interacting mobile terminals in accordance with some embodiments of the present application, providing more details. The first mobile terminal may have one or more processors; memory; and one or more programs modules stored in the memory and configured for execution by the one or more processors, the one or more program modules including: a connecting module 310 configured to connect to the server based on a first terminal identifier corresponding to the first mobile terminal, wherein the first mobile terminal is uniquely identified by the first terminal identifier at the server and the first mobile terminal connects to the server through a default connection setup embedded in the first terminal identifier; an identification module 320 configured to acquire, from the server, terminal identifiers corresponding to interacting mobile terminals and to establish communication channels between the first mobile terminal and the interacting mobile terminals through the server based on the terminal identifiers; a processing module 330 configured to add the terminal identifiers of the interacting mobile terminals to a contact list of the first mobile terminal, designate different regions of the first mobile terminal as corresponding to the interacting mobile terminals, wherein each region has an alterable display status, set the display status of the regions, wherein the display status is selected from the group consisting of: (1) not designated, (2) designated but not verified, (3) designated and verified, (4) designated, verified, but not authorized to send voice messages to the interacting terminal associated with the region, and (5) designated, verified, and authorized to send voice messages to the interacting terminal associated with the region; and a communication module 340 configured to receive digital contents encoding voice messages from an interacting mobile terminal, wherein the region associated with the interacting mobile terminal displays an alert at the region upon receiving the digital contents, play the voice message upon a user selection of the region, and record user input voice messages upon a user holding the region.

Figure 5:
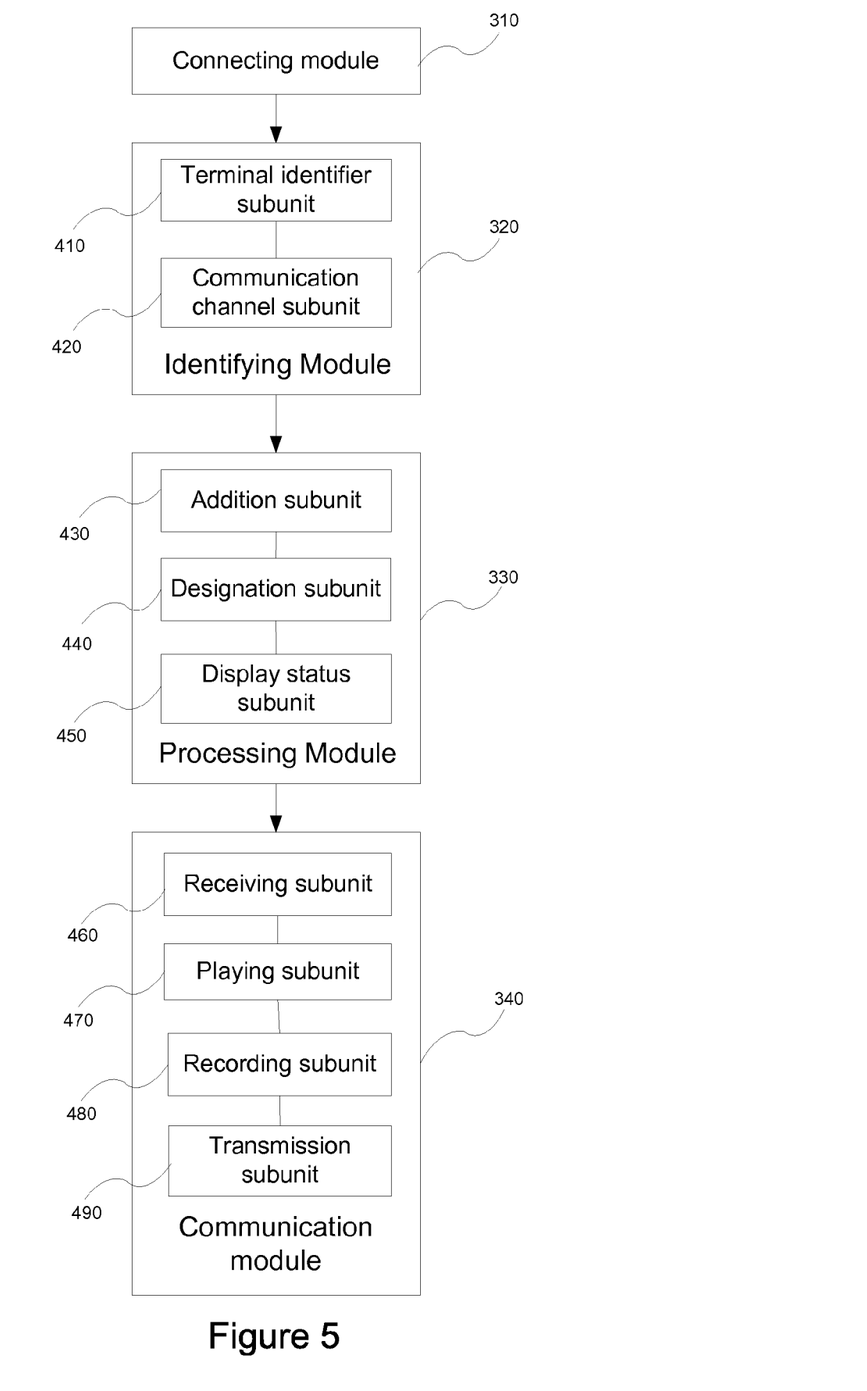
FIG. 5 is a block diagram illustrative of a first mobile terminal comprising modules configured to intercommunicate with one or more interacting mobile terminals in accordance with some embodiments of the present application, providing more details for the identifying module, the processing module, and the communication module.

FIG. 5 is a block diagram illustrative of a first mobile terminal comprising modules configured to intercommunicate with one or more interacting mobile terminals in accordance with some embodiments of the present application, providing more details for the identifying module, the processing module, and the communication module. The identification module 320 may have a terminal identifier subunit 410 and a communication channel subunit 420, wherein: the terminal identifier subunit 410 is configured to acquire, from the server, terminal identifiers corresponding to interacting mobile terminals, and the communication channel subunit 420 is configured to establish communication channels between the first mobile terminal and the interacting mobile terminals through the server based on the terminal identifiers. The processing module 330 may have an addition subunit 430, a designation subunit 440, and a display status subunit 450, wherein: the addition subunit 430 is configured to add the terminal identifiers of the interacting mobile terminals to a contact list of the first mobile terminal, the designation subunit 440 is configured to designate different regions of the first mobile terminal as corresponding to the interacting mobile terminals, wherein each region has an alterable display status, and the display status subunit 450 is configured to set the display status of the regions, wherein the display status is selected from the group consisting of: (1) not designated, (2) designated but not verified, (3) designated and verified, (4) designated, verified, but not authorized to send voice messages to the interacting terminal associated with the region, and (5) designated, verified, and authorized to send voice messages to the interacting terminal associated with the region. Furthermore, the communication module 340 may a receiving subunit 460, a playing subunit 470; and a recording subunit 480, wherein: the receiving subunit 460 is configured to receive digital contents encoding voice messages from an interacting mobile terminal, wherein the region associated with the interacting mobile terminal displays an alert at the region upon receiving the digital contents, the playing subunit 470 is configured to play the voice message upon a user selection of the region, and the recording subunit 480 is configured to record user input voice messages upon a user holding the region. In addition, as shown in FIG. 5, the communication module 340 may further include a transmission subunit 490 configured to send the user input voice messages to an interacting mobile terminal.

As indicated above, the first terminal identifier may be a barcode encoding first mobile terminal information corresponding to the first mobile terminal and the terminal identifiers may be barcodes encoding terminal information corresponding to the interacting mobile terminals. In addition, the connecting module 310 may be further configured to register the first mobile terminal identifier with the server. In addition, selecting the region associated with the interacting mobile terminal may cause the transmission subunit 490 to send the user input voice messages to the interacting mobile terminal. As indicated above, the recording subunit 480 and the transmission subunit 490 may be configured to record the user input voice messages and send the user input voice messages simultaneously. Alternatively, the recording subunit 480 and the transmission subunit 490 may be configured so that the user input voice messages are sent after the user input voice messages are recorded.

Figure 8:
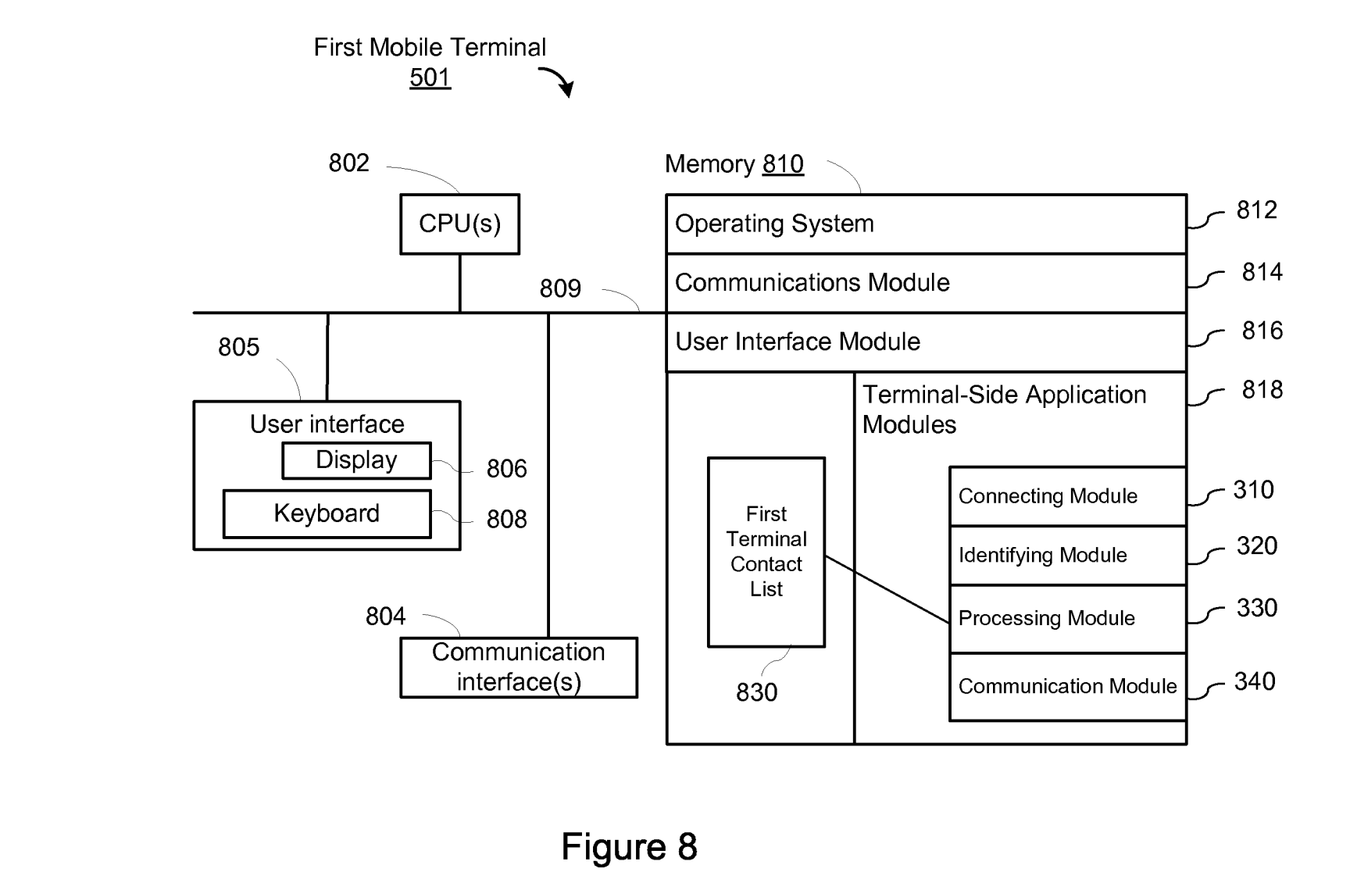
FIG. 8 is a block diagram of a first mobile terminal in accordance with some embodiments of the present application.

FIG. 8 is a block diagram of a first mobile terminal in accordance with some embodiments of the present application. The exemplary first mobile terminal 501 typically includes one or more processing units (CPU's) 802, one or more network or other communications interfaces 804, memory 810, and one or more communication buses 809 for interconnecting these components. The communication buses 809 may include circuitry (sometimes called a chipset) that interconnects and controls communications between system components. The first mobile terminal 501 may include a user interface 805, for instance, a display 806 and a keyboard 808. When the first mobile terminal 501 is a smart phone or tablet, the user interface 805 may be a touch screen that is both a display and an input device. Memory 810 may include high speed random access memory and may also include non-volatile memory, such as one or more magnetic disk storage devices. Memory 810 may include mass storage that is remotely located from the CPU's 802. In some embodiments, memory 810 stores the following programs, modules and data structures, or a subset or superset thereof:

- an operating system 812 that includes procedures for handling various basic system services and for performing hardware dependent tasks;
- a network communication module 814 that is used for connecting the first mobile terminal 501 to the server, the mobile terminals, and/or other computers via one or more communication networks (wired or wireless), such as the Internet, other wide area networks, local area networks, metropolitan area networks, and so on;
- a user interface module 816 configured to receive user inputs through the user interface 805;
- and a number of terminal-side application modules 818 including the following:
- a connecting module 310 configured to connect to the server based on a first terminal identifier corresponding to the first mobile terminal, wherein the first mobile terminal is uniquely identified by the first terminal identifier at the server and the first mobile terminal connects to the server through a default connection setup embedded in the first terminal identifier;
- an identification module 320 configured to acquire, from the server, terminal identifiers corresponding to interacting mobile terminals and to establish communication channels between the first mobile terminal and the interacting mobile terminals through the server based on the terminal identifiers;
- a processing module 330 configured to add the terminal identifiers of the interacting mobile terminals to a contact list 830 of the first mobile terminal, designate different regions of the first mobile terminal as corresponding to the interacting mobile terminals, wherein each region has an alterable display status, set the display status of the regions, wherein the display status is selected from the group consisting of: (1) not designated, (2) designated but not verified, (3) designated and verified, (4) designated, verified, but not authorized to send voice messages to the interacting terminal associated with the region, and (5) designated, verified, and authorized to send voice messages to the interacting terminal associated with the region;
- and a communication module 340 configured to receive digital contents encoding voice messages from an interacting mobile terminal, wherein the region associated with the interacting mobile terminal displays an alert at the region upon receiving the digital contents, play the voice message upon a user selection of the region, and record user input voice messages upon a user holding the region.

While particular embodiments are described above, it will be understood it is not intended to limit the invention to these particular embodiments. On the contrary, the invention includes alternatives, modifications and equivalents that are within the spirit and scope of the appended claims. Numerous specific details are set forth in order to provide a thorough understanding of the subject matter presented herein. But it will be apparent to one of ordinary skill in the art that the subject matter may be practiced without these specific details. In other instances, well-known methods, procedures, components, and circuits have not been described in detail so as not to unnecessarily obscure aspects of the embodiments.

The terminology used in the description of the invention herein is for the purpose of describing particular embodiments only and is not intended to be limiting of the invention. As used in the description of the invention and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, operations, elements, and/or components, but do not preclude the presence or addition of one or more other features, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

Although some of the various drawings illustrate a number of logical stages in a particular order, stages that are not order dependent may be reordered and other stages may be combined or broken out. While some reordering or other groupings are specifically mentioned, others will be obvious to those of ordinary skill in the art and so do not present an exhaustive list of alternatives. Moreover, it should be recognized that the stages could be implemented in hardware, firmware, software or any combination thereof.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A method for voice communication between mobile terminals, the method comprising:
    at a first mobile terminal having one or more processors and memory storing programs executed by the one or more processors,
        connecting to a server based on a first terminal identifier corresponding to the first mobile terminal, wherein the first mobile terminal is uniquely identified by the first terminal identifier at the server and the first mobile terminal connects to the server through a default connection setup embedded in the first terminal identifier;
    acquiring, from the server, terminal identifiers corresponding to interacting mobile terminals;
    establishing communication channels between the first mobile terminal and the interacting mobile terminals through the server based on the terminal identifiers;
    adding the terminal identifiers of the interacting mobile terminals to a contact list of the first mobile terminal;
    designating different regions of the first mobile terminal as corresponding to the interacting mobile terminals, wherein each region has an alterable display status;
    setting the display status of the regions, wherein the display status is selected from the group consisting of:
        1) not designated;
        2) designated but not verified;
        3) designated and verified;
        4) designated, verified, but not authorized to send voice messages to the interacting terminal associated with the region;
        5) designated, verified, and authorized to send voice messages to the interacting terminal associated with the region;
    receiving digital contents encoding voice messages from an interacting mobile terminal, wherein the region associated with the interacting mobile terminal displays an alert at the region upon receiving the digital contents;
    playing the voice message upon a user selection of the region; and
    recording user input voice messages upon a user holding the region.

2. The method of claim 1, wherein:
the first terminal identifier is a barcode encoding first terminal information corresponding to the first mobile terminal.

3. The method of claim 1, wherein:
the terminal identifiers are barcodes encoding terminal information corresponding to the interacting mobile terminals.

4. The method of claim 1, further comprising:
registering the first terminal identifier with the server.

5. The method of claim 1, wherein:
the interacting mobile terminals add the first terminal identifier to terminal contact lists.

6. The method of claim 1, further comprising:
sending the user input voice messages to an interacting mobile terminal.

7. The method of claim 6, further comprising:
selecting the region associated with the interacting mobile terminal before sending the user input voice messages to the interacting mobile terminal.

8. The method of claim 6, wherein:
the steps of recording the user input voice messages and sending the user input voice messages are conducted simultaneously.

9. The method of claim 6, wherein:
the step of sending the user input voice messages is conducted after the step of recording the user input voice messages is completed.

10. A computer system, comprising a server, a first terminal, and one or more interacting terminals, the first terminal having:
    one or more processors;
    memory; and
    one or more programs modules stored in the memory and configured for execution by the one or more processors, the one or more program modules including:
        a connecting module configured to connect to the server based on a first terminal identifier corresponding to the first mobile terminal, wherein the first mobile terminal is uniquely identified by the first terminal identifier at the server and the first mobile terminal connects to the server through a default connection setup embedded in the first terminal identifier;
        an identification module having a terminal identifier subunit and a communication channel subunit, wherein:
            the terminal identifier subunit is configured to acquire, from the server, terminal identifiers corresponding to interacting mobile terminals, and
            the communication channel subunit is configured to establish communication channels between the first mobile terminal and the interacting mobile terminals through the server based on the terminal identifiers;
        a processing module having an addition subunit, a designation subunit, and a display status subunit, wherein:

the addition subunit is configured to add the terminal identifiers of the interacting mobile terminals to a contact list of the first mobile terminal, the designation subunit is configured to designate different regions of the first mobile terminal as corresponding to the interacting mobile terminals, wherein each region has an alterable display status, and the display status subunit is configured to set the display status of the regions, wherein the display status is selected from the group consisting of:
1) not designated;
2) designated but not verified;
3) designated and verified;
4) designated, verified, but not authorized to send voice messages to the interacting terminal associated with the region;
5) designated, verified, and authorized to send voice messages to the interacting terminal associated with the region; and a communication module having a receiving subunit, a playing subunit; and a recording subunit, wherein:
the receiving subunit is configured to receive digital contents encoding voice messages from an interacting mobile terminal, wherein the region associated with the interacting mobile terminal displays an alert at the region upon receiving the digital contents, the playing subunit is configured to play the voice message upon a user selection of the region, and the recording subunit is configured to record user input voice messages upon a user holding the region.

11. The computer system of claim 10, wherein:
the first terminal identifier is a barcode encoding first terminal information corresponding to the first mobile terminal.

12. The computer system of claim 10, wherein:
the terminal identifiers are barcodes encoding terminal information corresponding to the interacting mobile terminals.

13. The computer system of claim 10, wherein the connecting module is further configured to:
registering the first terminal identifier with the server.

14. The computer system of claim 10, wherein:
the interacting mobile terminals add the first terminal identifier to terminal contact lists.

15. The computer system of claim 10, wherein:
the communication module further comprises a transmission subunit, and
the transmission subunit is configured to send the user input voice messages to an interacting mobile terminal.

16. The computer system of claim 15, wherein:
selecting the region associated with the interacting mobile terminal causes the transmission subunit to send the user input voice messages to the interacting mobile terminal.

17. The computer system of claim 15, wherein:
the recording subunit and the transmission subunit are configured to record the user input voice messages and send the user input voice messages simultaneously.

18. The computer system of claim 15, wherein:
the recording subunit and the transmission subunit are configured so that the user input voice messages are sent after the user input voice messages are recorded.

19. A non-transitory computer readable storage medium having stored therein one or more instructions, which, when executed by a first terminal, cause the first terminal to:
connect to a server based on a first terminal identifier corresponding to the first mobile terminal, wherein the first mobile terminal is uniquely identified by the first terminal identifier at the server and the first mobile terminal connects to the server through a default connection setup embedded in the first terminal identifier;
acquire, from the server, terminal identifiers corresponding to interacting mobile terminals;
establish communication channels between the first mobile terminal and the interacting mobile terminals through the server based on the terminal identifiers;
add the terminal identifiers of the interacting mobile terminals to a contact list of the first mobile terminal;
designate different regions of the first mobile terminal as corresponding to the interacting mobile terminals, wherein each region has an alterable display status;
set the display status of the regions, wherein the display status is selected from the group consisting of:
1) not designated;
2) designated but not verified;
3) designated and verified;
4) designated, verified, but not authorized to send voice messages to the interacting terminal associated with the region;
5) designated, verified, and authorized to send voice messages to the interacting terminal associated with the region;
receive digital contents encoding voice messages from an interacting mobile terminal, wherein the region associated with the interacting mobile terminal displays an alert at the region upon receiving the digital contents;
play the voice message upon a user selection of the region; and
record user input voice messages upon a user holding the region.

20. The non-transitory computer readable storage medium of claim 19, wherein the instructions further cause the first terminal to:
register the first terminal identifier with the server.

* * * * *